R. Cornelius,

Oil Pump.

No. 2,545. Reissued Apr. 9, 1867.

Witnesses

J. E. Shaw

Geo. Buckley

Inventor.

Robert Cornelius

H. PETERS, PHOTO-LITHOGRAPHER, WASHINGTON, D. C.

United States Patent Office.

ROBERT CORNELIUS, OF PHILADELPHIA, PENNSYLVANIA.

*Letters Patent No.* 53,117, *dated March* 13, 1866; *reissue No.* 2,545, *dated April* 9, 1867.

IMPROVEMENT IN PUMPS FOR DEEP WELLS.

The Schedule referred to in these Letters Patent and making part of the same.

TO ALL WHOM IT MAY CONCERN:

Be it known that I, ROBERT CORNELIUS, of the city of Philadelphia, and State of Pennsylvania, have invented a new and useful Improvement in Pumps for Oil Wells; and I do hereby declare the following to be a full and exact description of the same, reference being had to the annexed drawings, making a part of this specification, in which—

Numerous attempts have been made to overcome the difficulty in the use of the ordinary oil-pump, arising from the fact that the heavy column of fluid in the tube above the pump pressing upon the upper puppet-valve, keeps it in its seat while the piston is descending; consequently the descent of the piston merely condenses the gas in the pump-chamber, and when the piston ascends, this condensed gas only expands, consequently no vacuum is produced below the piston; therefore the entrance of oil into the pump at its lower extremity does not take place. In such pumps, where there is much gas in the well, the piston continues to operate for a length of time without producing any apparent effect in raising gas or oil from the well.

Figure 1:
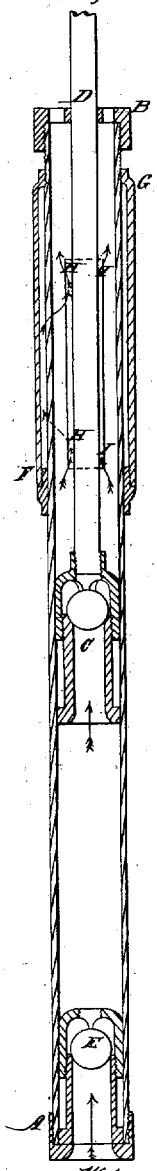
Figure 1 is a vertical section of my improved pump.
Figure 2:
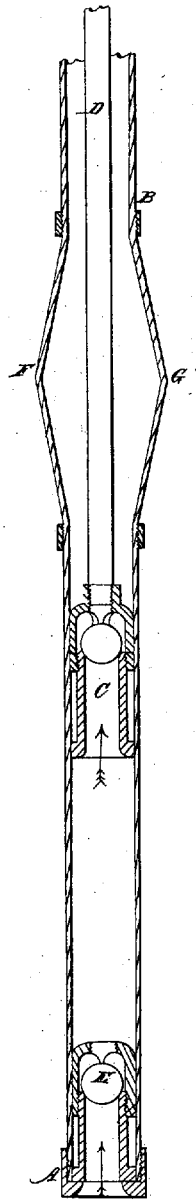
Figures 2 and 3 are vertical sections, showing an alternative form of my improved pump.
Figure 3:
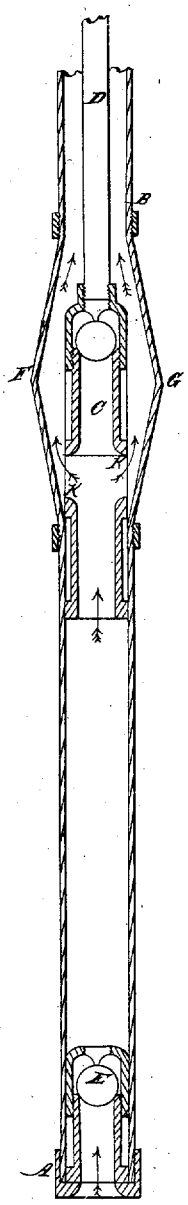

The nature of my improvement consists in enlarging the pump-chamber at the upper end of the stroke of the piston, so as to form a circumferential passage for the descent of the liquid and the displacement of the gas. In fig. 1, A B represents the ordinary pump-chamber, usually about five feet long, and one inch and three-fourths in diameter. C is an ordinary piston, with its ball-valve. D is the ordinary piston-rod, and E is the ordinary ball-valve at the lower part of the pump-chamber. In these respects the figure represents a common pump. At *F* G, I surround the exterior of the pump-tube by another tube, F G, two inches in diameter, and twenty-two inches long, forming an annular passage or chamber, one-fourth of an inch wide, all around the walls of the pump-chamber. This exterior tube is screwed to the pump-tube at both extremities, as shown at *F* and *G*. One or more vertical slots or apertures, H I, are made, communicating between the interior of the pump-chamber and the exterior chamber *F G*. The operation of the exterior chamber F G, in connection with its passages, is as follows: As the piston ascends, it draws the gas, or oil containing a great quantity of gas, into the chamber, and when the piston has passed above the point *F*, the liquid from above descends, and liberates the gas from below, which escapes by reason of its levity. The place occupied by the gas is replaced by liquid from above coming down through the exterior chamber and the slotted passages. The pump-chamber below the piston is thus filled with fluid instead of gas, and as the piston descends, the upper valve freely opens as the piston slides down. If there be a supply of fluid, either oil or water, below, the pump will raise this up as an ordinary pump; but if gas enters the pump-chamber, it will be liberated as stated. Thus the piston can never be occupied in merely condensing gas, as in the ordinary pump, but must either raise a column of fluid or compel a column of gas to ascend. An enlargement of the cylinder, as shown at F G, figs. 2 and 3, will answer the same purpose as the chamber in fig. 1; and to prevent the piston in such cases from wabbling in the enlarged passage, a guide-tube or socket, covered with leather, with side openings K K, may be used to guide the piston.

Having thus described my improvement, what I claim as my invention, and desire to secure by Letters Patent, is—

Forming an annular chamber around the body of the pump at the top of the stroke, and connecting this chamber by a series of openings with the interior of the pump-chamber, in such a manner that when the piston rises above the openings, the liquid from above will flow into the body of the pump and displace the gas, substantially as described.

ROBERT CORNELIUS.

Witnesses:
J. E. SHAW,
GEO. BUCKLEY.